United States Patent
Jones (12)

(10) Patent No.: US 6,170,437 B1
(45) Date of Patent: Jan. 9, 2001

(54) VARIABLE VOLUME MULTI-SPECIES BIRD HOUSE

(75) Inventor: James Don Jones, Hensley, AR (US)

(73) Assignee: Cornerstone Financial Management, Little Rock, AR (US)

(*) Notice: Under 35 U.S.C. 154(b), the term of this patent shall be extended for 0 days.

(21) Appl. No.: 09/316,063

(22) Filed: May 21, 1999

(51) Int. Cl.[7] .................................................. A01K 31/14
(52) U.S. Cl. ........................................ 119/428; 119/431
(58) Field of Search .................................... 119/428, 429, 119/431, 432, 433, 434, 435, 482, 487, 491, 492, 493, 496

(56) References Cited

U.S. PATENT DOCUMENTS

| | | | |
|---|---|---|---|
| 479,942 | * 8/1892 | Holladay | 119/491 |
| 807,196 | * 12/1905 | O'Brien | 119/487 |
| 1,010,358 | * 11/1911 | Fox | 119/491 |
| 1,081,847 | * 12/1913 | Lyman | 119/491 |
| 1,166,100 | * 12/1915 | White | 119/428 |
| 1,173,823 | * 2/1916 | McDaniel | 119/494 |
| 1,748,349 | * 2/1930 | Ijams | 119/432 |
| 3,182,634 | * 5/1965 | Myaida et al. | 119/428 |
| 3,250,249 | * 5/1966 | Nelson et al. | 119/431 |
| 3,592,169 | * 7/1971 | Killmon | 119/432 |
| 3,643,631 | * 2/1972 | Wade et al. | 119/434 |
| 4,104,988 | * 8/1978 | Trutor | 119/57.8 |
| 4,167,917 | 9/1979 | Noll | 119/23 |
| 4,442,793 | 4/1984 | Overpeck et al. | 119/23 |
| 4,768,466 | 9/1988 | Burns et al. | 119/23 |
| 5,134,970 | * 8/1992 | Oh | 119/428 |
| 5,269,255 | 12/1993 | Finn | 119/23 |
| 5,479,877 | 1/1996 | Demboske | 119/23 |
| 5,493,997 | 2/1996 | Ritchey | 119/23 |
| 5,746,156 | 5/1998 | Petrides et al. | 119/428 |

* cited by examiner

*Primary Examiner*—Michael J. Carone
*Assistant Examiner*—James S. Bergin
(74) *Attorney, Agent, or Firm*—Stephen D. Carver

(57) ABSTRACT

A variable-volume birdhouse comprises an internal nesting volume that varies in height, width and breadth to suit desired bird species. The nesting volume maintains a generally cubicle interior shape. A plurality of generally orthogonal, intersecting plywood panels form the enclosure. The base panel supports a pair of spaced-apart, side panels that removably mount an upper roof panel. A perpendicular back panel extends between the side panels in spaced relation relative to a front door panel that is hinged to the enclosure for easy user access. Hooks projecting from the panels are received within suitable slits in adjacent panels to lock them together. An internal, vertical partition is slidably fitted within selected grooves in the base and rear panels to establish internal width. An appropriately-sized shelf is fitted between the partition and the right side panel. The nesting volume rear is bounded by an appropriately dimensioned rear wall. By adjusting dimensions of the partition, the shelves and the rear wall during assembly, a desired volume preferred by a selected bird species results. A plurality of internal storage volumes contain substitute floor shelves and rear walls that are deployed for different nesting volume. A variable-diameter hole system in the front panel provides access to the nesting volume. A magazine slidably received within the front panel has an orifice aligned with the hole system that is occluded by a selected restrictor ring. Different restrictor rings stored in the magazine have different hole diameters suitable for different bird species.

18 Claims, 10 Drawing Sheets

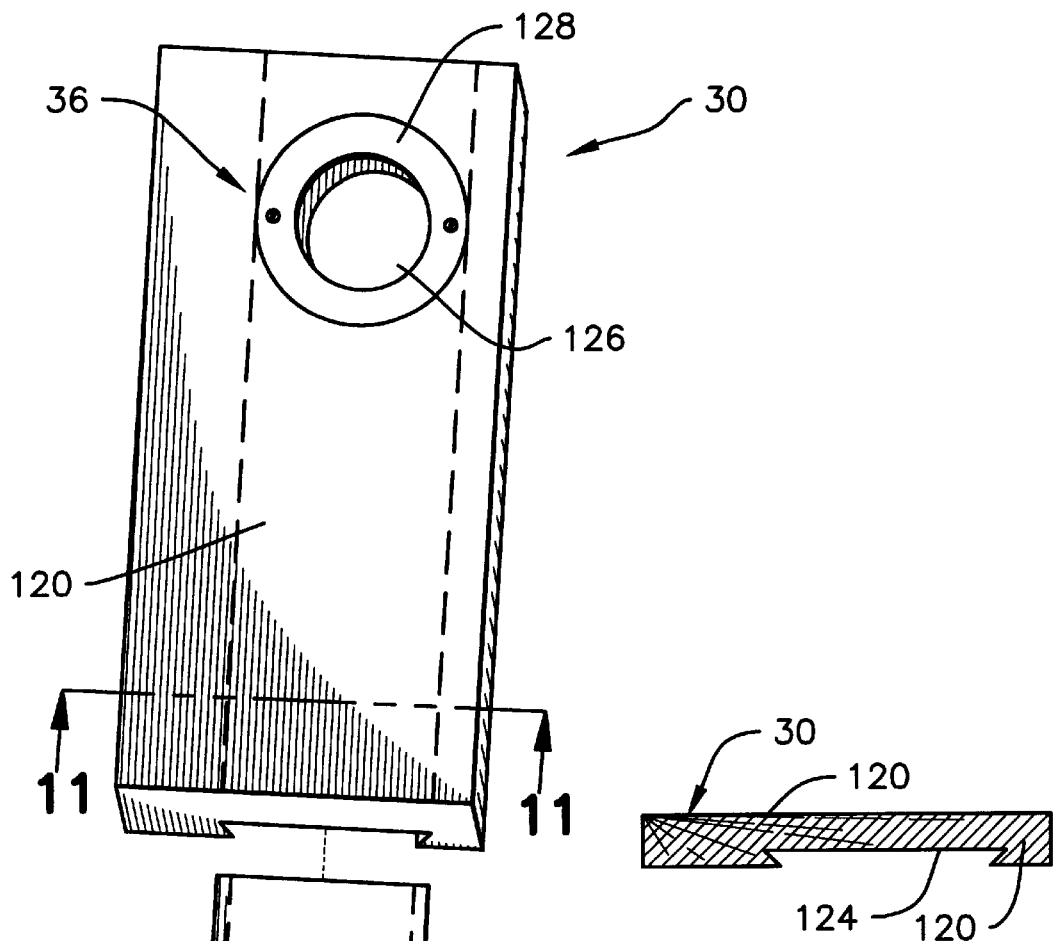
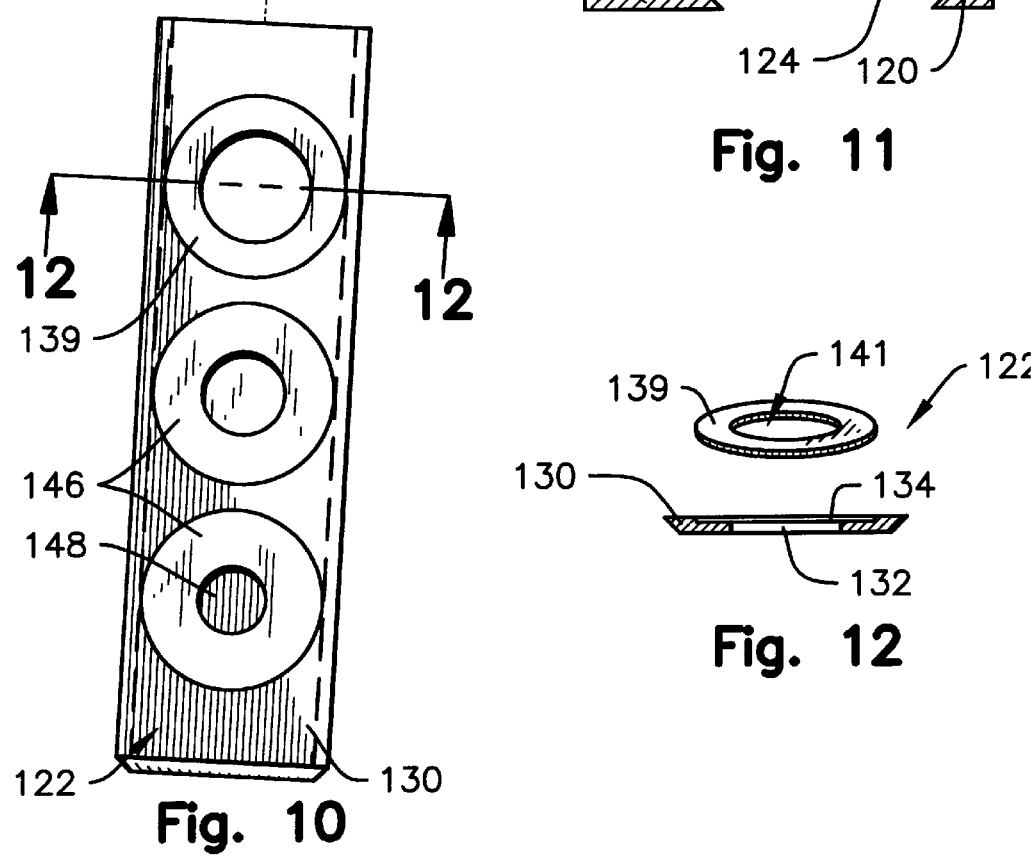
Fig. 10
Fig. 11
Fig. 12

VARIABLE VOLUME MULTI-SPECIES BIRD HOUSE

BACKGROUND OF THE INVENTION

I. Field of the Invention

The present invention relates generally to bird houses or bird nesting boxes. More particularly, the present invention relates to bird houses that may be changed in form by the user for use by specific bird species. Known prior art is found in United States Class 119, Subclasses 428 and 431.

II. Description of the Prior Art

Numerous wild birds will nest in artificial structures if such bird boxes or bird houses are designed properly. It has long been recognized by those skilled in the art that variations in the size, appearance, dimensions or form of a bird house or nesting box greatly affects the type of bird it attracts. There are several hundred species of birds common to North America, and the nesting habits of various species differ markedly. For a given bird house to be maximally attractive to a particular species, it must have an internal volume in a specific range, and the entrance hole through which birds obtain ingress and egress must be appropriately designed. For optimum attractiveness, the entrance orifice, for example, should be spaced at an attractive height above the bird house floor. Of course the orifice must be sized correctly. It is also important to place birdhouses at an appropriate height above ground that is desired by the target species. By properly configuring a bird house for a given species, it will be much more attractive to members of that species. At the same time, it will be much more unattractive to unwanted species.

I have observed that common North American birds such as wrens, chickadees, downey woodpeckers, nuthatches and titmice prefer a relatively small internal enclosure, usually less than one-hundred cubic inches. Bluebirds, swallows, and many warblers prefer a medium sized nesting volume, of approximately one hundred and fifty cubic inches. Birds such as Ash-throated flycatchers of Great crested flycatchers prefer larger nesting volumes of approximately two-hundred cubic inches or greater. Different species of birds prefer the entrance hole to be at different heights. The optimum entrance hole diameter may vary from one and one-eight inches with chickadees, to one and three-quarters inches with larger flycatchers. With each species the ideal placement height will be different as well.

Thus for a birdwatcher to reliably attract many diverse bird species to his or her yard, numerous bird houses with different dimensions and placements are necessary. For the vendor, who stocks and sells bird houses and bird boxes, the many different required sizes that must be kept in stock makes inventory difficult. For the buyer, the diverse size requirements negatively limit the species of bird that his yard may attract.

U.S. Pat. No. 5,269,255 shows a variable volume bird house. Internal volume may be adjusted by moving a floor panel upwardly or downwardly. Various slots or braces call be used to position the floor at a selected height to make the birdhouse comfortable for specific bird species. However, the wall spacing remains fixed, so that the resultant internal volume may not be shaped like a cube.

U.S. Pat. No. 4,167,917 includes various sliding and removable panels that can vary the entry-hole size for different species of birds, U.S. Pat. No. 5,746,156 shows the selective sizing of the entry/exit hole by a movable panel.

Other references such as U.S. Pat. Nos. 5,493,997 and 4,442,793 show various common construction details such as folding and sliding panels.

Regardless of size or configuration, bird nesting structures must periodically be maintained and inspected. Old nests should be discarded. The structure must be cleansed of insects or other parasites that may accumulate in tile decomposing organic matter forming the nest. Debris and bird droppings must be removed.

Thus an ideal bird house should be easily broken down or partially disassembled by the user. Additionally, an ideal bird house should have an entrance hole that is optimized In size and location. Floor dimensions and height must also be appropriate for a target species. The structure should exhibit adequate ventilation and drainage characteristics. The roof should be overhanging. Tile enclosure panels should be at least three quarters of an inch thick. Finally, it is best if a perch is omitted.

SUMMARY OF THE INVENTION

This invention comprises a bird house that provides an internal nesting area of variable dimensions and volume. The internal nesting area can be adjusted both vertically and horizontally to maintain a desired, generally cubicle interior of appropriate dimenisions.

A plurality of orthogonally-oriented, intersecting panels form the enclosure. A rectangular base panel extends between a pair of spaced-apart, vertical side panels that support a removable, inclined roof on the top. The enclosure is completed by a back panel extending between the side panels, and a hinged, front panel provided with a variable-diameter hole for letting birds into the internally defined nesting volume. The front panel is preferably hinged to the enclosure to allow easy user access for cleaning. Suitable hooks projecting from edges of panels are received within suitable mounting slits to lock the panels together.

An internal, vertical partition is slidably fitted within grooves defined in the base and rear panels. A selected floor shelf is fitted between the partition and the inner surface of the right side panel. The rear of the nesting volume is further bounded by a selected rear wall that is also constrained within suitable, registered grooves. By adjusting internal dimensions during assembly, a user can form a desired internal nesting volume preferred by a selected species of bird. A plurality of storage volumes contain substitute floor shelves and rear walls that are deployed when different nesting volumes are selected.

The hole in the front door panel can be varied in volume to suit a selected bird species. Preferably the front door panel is hinged to the enclosure. It includes a relatively large-diameter orifice bounded by an annular reinforcement. A sliding magazine is fitted within a chamber defined in the door panel. It includes an adjustable orifice that aligns with the larger front panel orifice during assembly. The magazine stores a plurality of annular restrictors having different hole diameters. A selected restrictor is snap fitted within an annular recess coaxially surrounding the magazine orifice to select a proper entrance diameter. Suitable recesses defined in the magazine conveniently store the other restrictors.

Since all of the panels conveniently latch together, the unit may be easily broken down for cleaning or storage. The entire assembly can be shipped or stored in an unassembled state, with the generally planar panels lying flatly on top of one another.

Thus a basic object is to provide a bird house or nesting box that can be tailored to optimally attract a specific species of bird.

A related object is to provide a bird box with an internal nesting area that can be radically varied in volume as desired by the user to target a selected bird species.

A related object is to provide a bird nesting box of the character described that can easily be cleaned.

Another object is to provide a bird nesting box of the character described that can be rapidly and easily assembled.

Another important object is to provide a nesting box of the character described providing a variable volume nesting region that can be adjusted simply by sliding desired pieces into place.

It is also an important object to provide a bird nesting box of the character described that, once assembled, provides a sturdy and reliable nesting enclosure.

Another basic object is to provide a bird nesting box of the character described that is transformable for use with diverse bird species.

A further object is to provide a transformable bird house that includes and stores a plurality of self contained pieces that slidably interfit with one another within the enclosure to rapidly and conveniently vary enclosure volume.

Another important object is to provide a transformable bird nesting box of the character described whose entrance orifice may quickly and easily be varied in diameter.

A still further object is to provide a nesting box of the character described in which the height of the entrance orifice with respect to the floor of the enclosure may be varied.

Another object is to provide a transformable or convertible bird box enclosure that can be provided with an internal perch.

Still another object is to provide a bird box that can be used as a feeder.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 10 is an exploded isometric view of the preferred front wall assembly;

FIG. 11 is a sectional view taken generally along line 11—11 in FIG. 10;

FIG. 12 is an enlarged, partially sectional and partially perspective semi-exploded view taken generally along line 12—12 in FIG. 10; and, FIG. 13 is an enlarged fragmentary sectional view showing the preferred hook and fastening arrangement.

DETAILED DESCRIPTION

Figure 1:
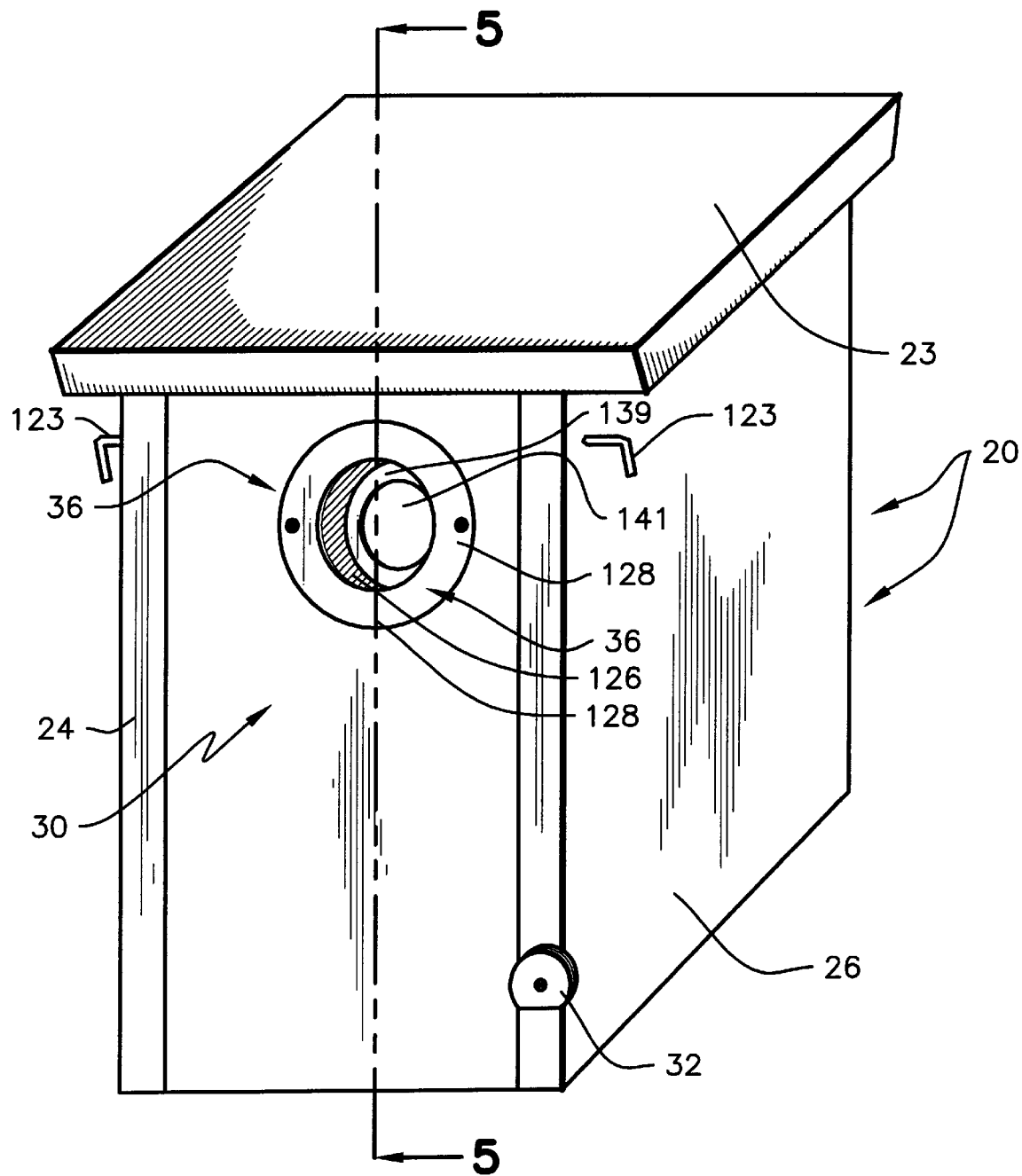
FIG. 1 is a front perspective view of the preferred birdhouse.
Figure 2:
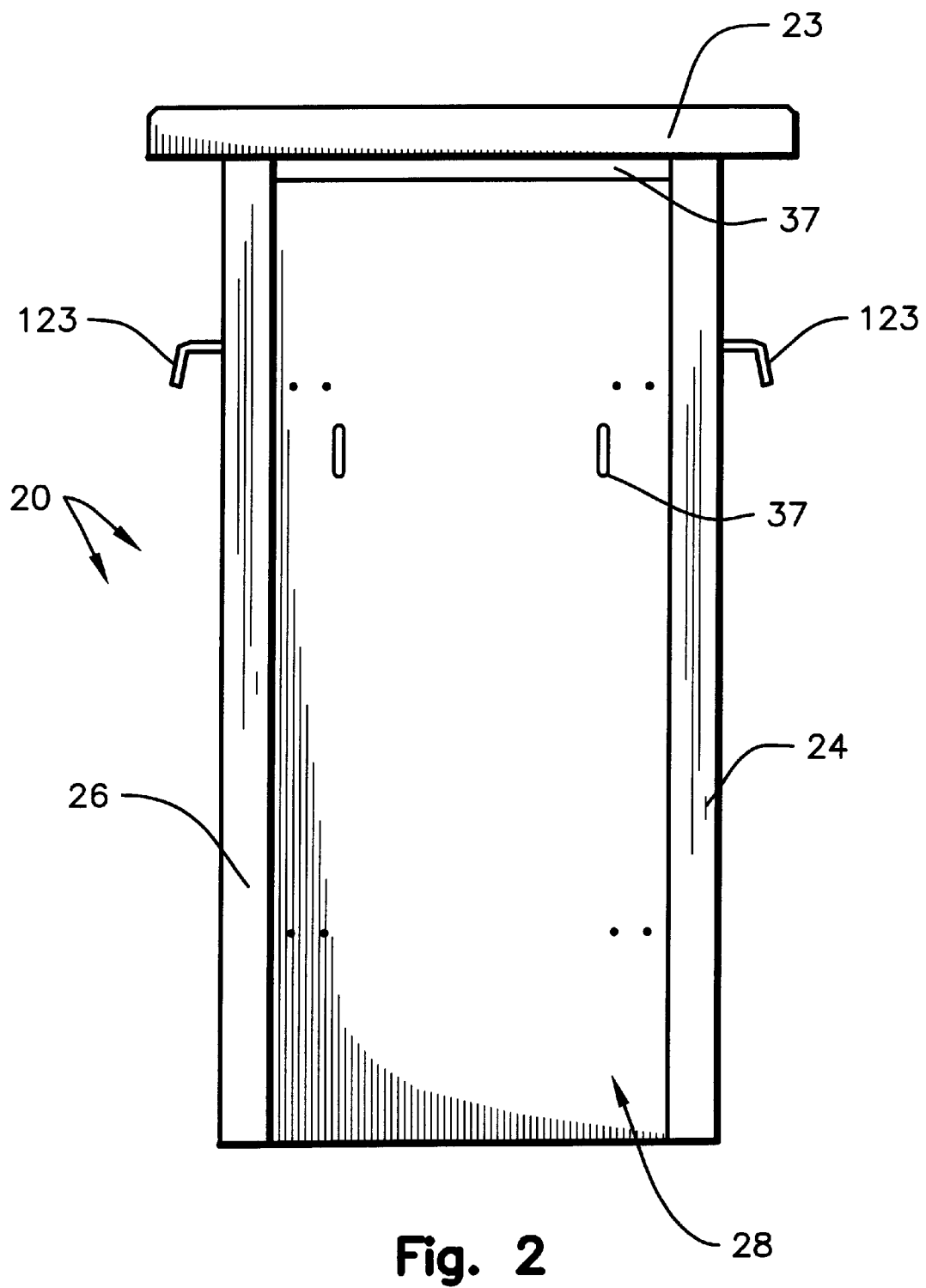
FIG. 2 is a rear plan view of the preferred birdhouse.
Figure 3:
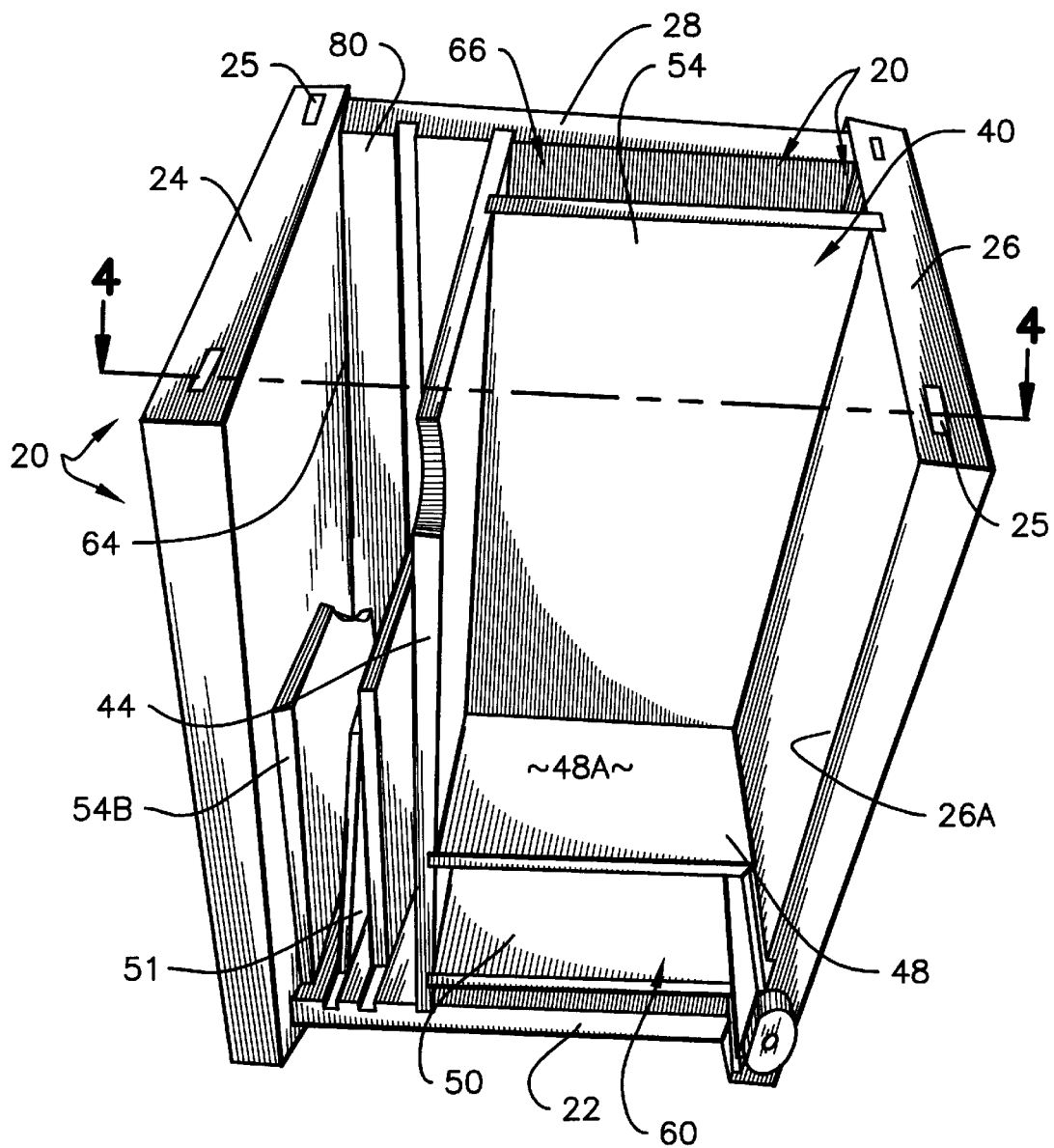
FIG. 3 is a partially-exploded, frontal perspective view, with the front panel and roof removed, and with the volume changing shelves installed.
Figure 4:
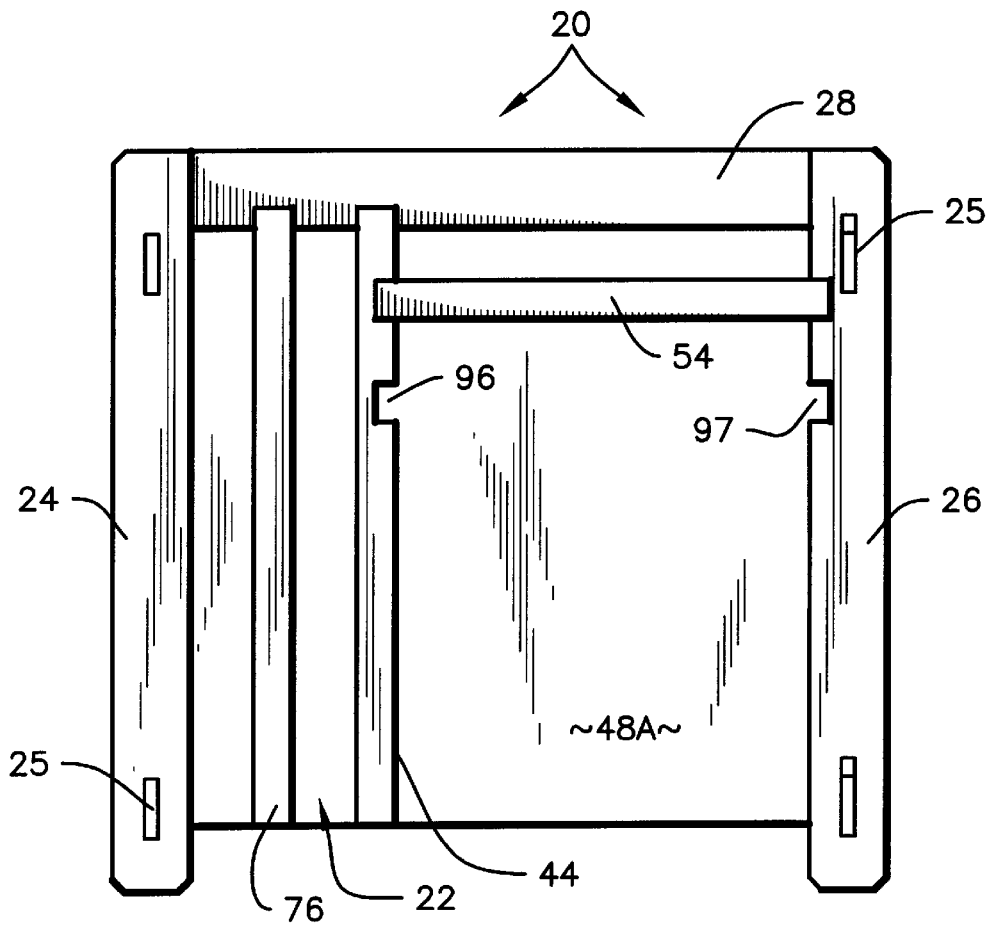
FIG. 4 is a fragmentary, top plan view taken generally along line 4—4 in FIG. 3, with portions thereof omitted for clarity.

Turning now to FIGS. 1–3 of the appended drawings, the reference numeral 20 generally indicates a variable volume birdhouse constructed in accordance with the teachings of this invention. As best seen in FIGS. 1–5, the box-like birdhouse 20 is generally cubicle. It comprises a lower, generally rectangular base panel 22 that is spaced apart from and upper, generally rectangular and inclined roof panel 23. A pair of spaced apart side panels, 24 and 26 (FIGS. 1, 3, 5), form opposite sides of the birdhouse. A generally rectangular back panel 28 extends between and is hooked to side panels 24 and 26. The back panel 28 is perpendicular to base panel but is not latched to it. As best seen in FIG. 2, it is preferred that the back panel dimensions be such that a ventilation slot 55 be formed beneath roof 23. In the best mode, external panels 22, 23, 24, 26, 28 and 30 are made from wood, preferably cedar, that is three-quarter inches thick. The panels can be made from plywood, plastic or other materials.

A generally rectangular front door assembly 30 is hinged at the front of the birdhouse 20, and is normally latched shut by doorknob 32. It includes an adjustable orifice structure 36 to be described in detail hereinafter that allows a bird ingress and egress to the enclosure interior. The diameter of the orifice stucture is varied to suit the desired bird species, as explained hereinafter. In the best mode the front door is cut from ¾ inch wood.

Figure 6:
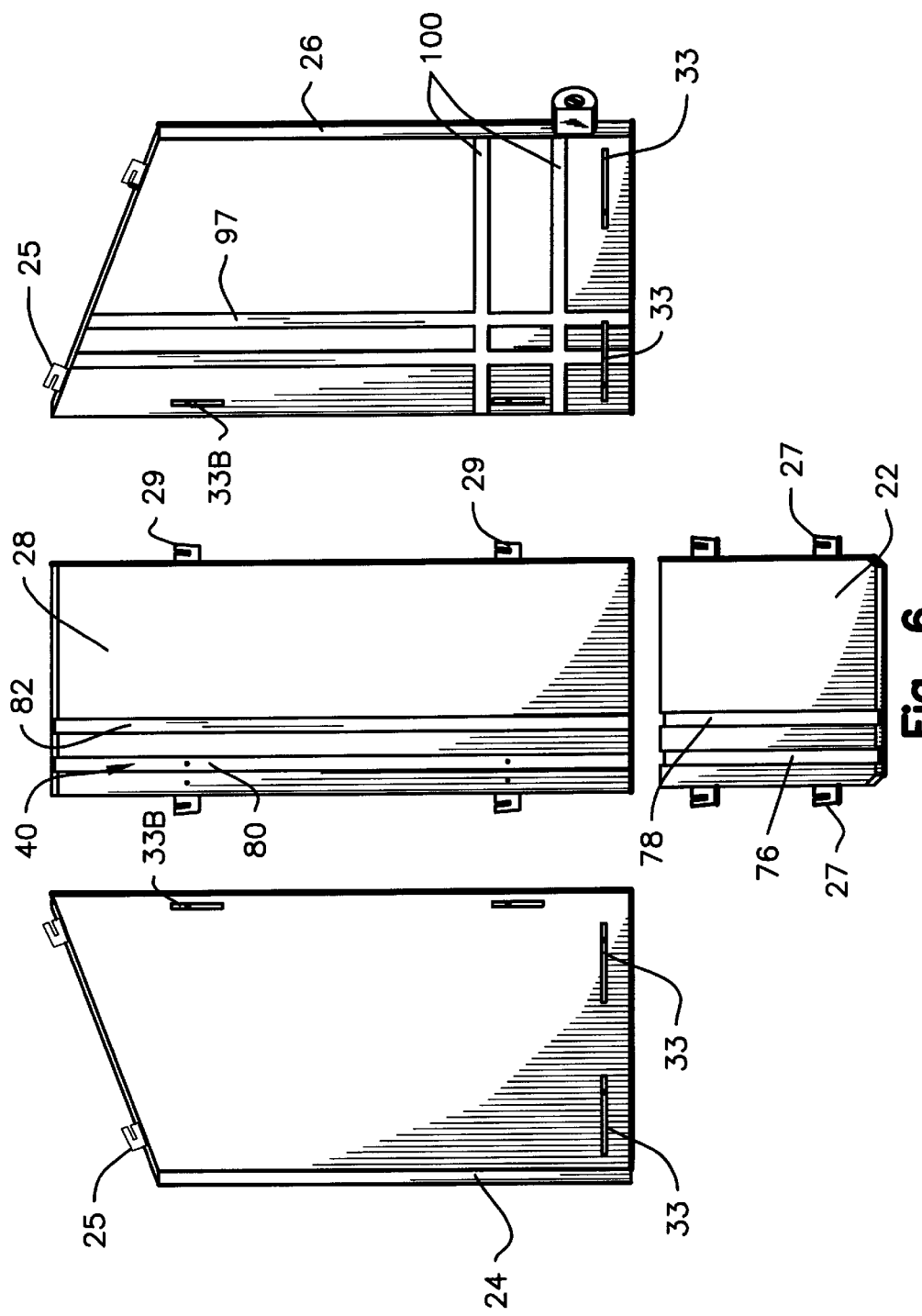
FIG. 6 is a partially-exploded, frontal plan view of major components, with portions thereof omitted for clarity.

An interior nesting region 40 (FIG. 3) is generally defined between the aforesaid panels. The nesting region 40 forms the nesting area for birds entering through the orifice structure 36. The volume of nesting region 40, generally in the form of a parallelepiped, is adjustable by the user, who can easily vary its effective dimensions. Nesting region 40 is readily revealed when the roof panel 23 is removed (FIG. 3). Preferably the roof panel 23 is removably fastened at the top of the birdhouse by suitable hooks 25 press fitted into the top edges of side panels 24 and 26 (FIGS. 3, 6). Similar hooks 27 projecting from opposite edges of base panel 22 (FIG. 7) engage suitable slits 33 (FIGS. 6, 8) defined in the bottom of side panels 24 and 26. Identical hooks 29 projecting from side edges of back panel 28 (FIG. 6) register within suitable vertically-oriented slits 33 B (FIG. 6) formed in side panels 24,26.

Figure 13:
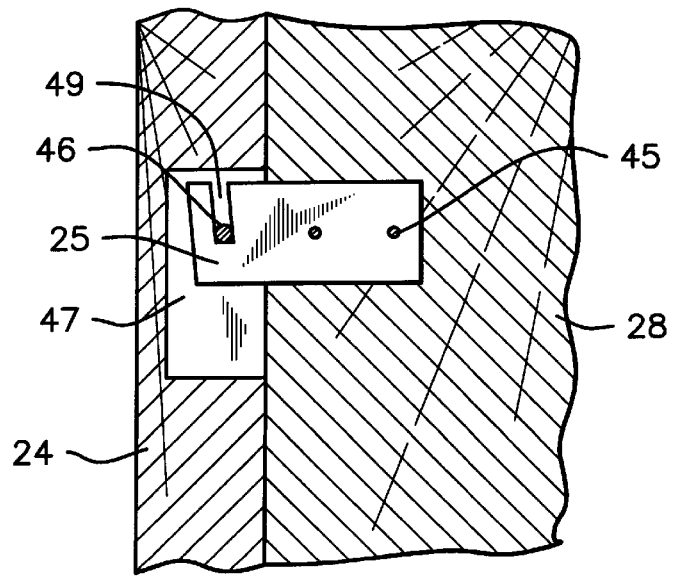
Figure 5:
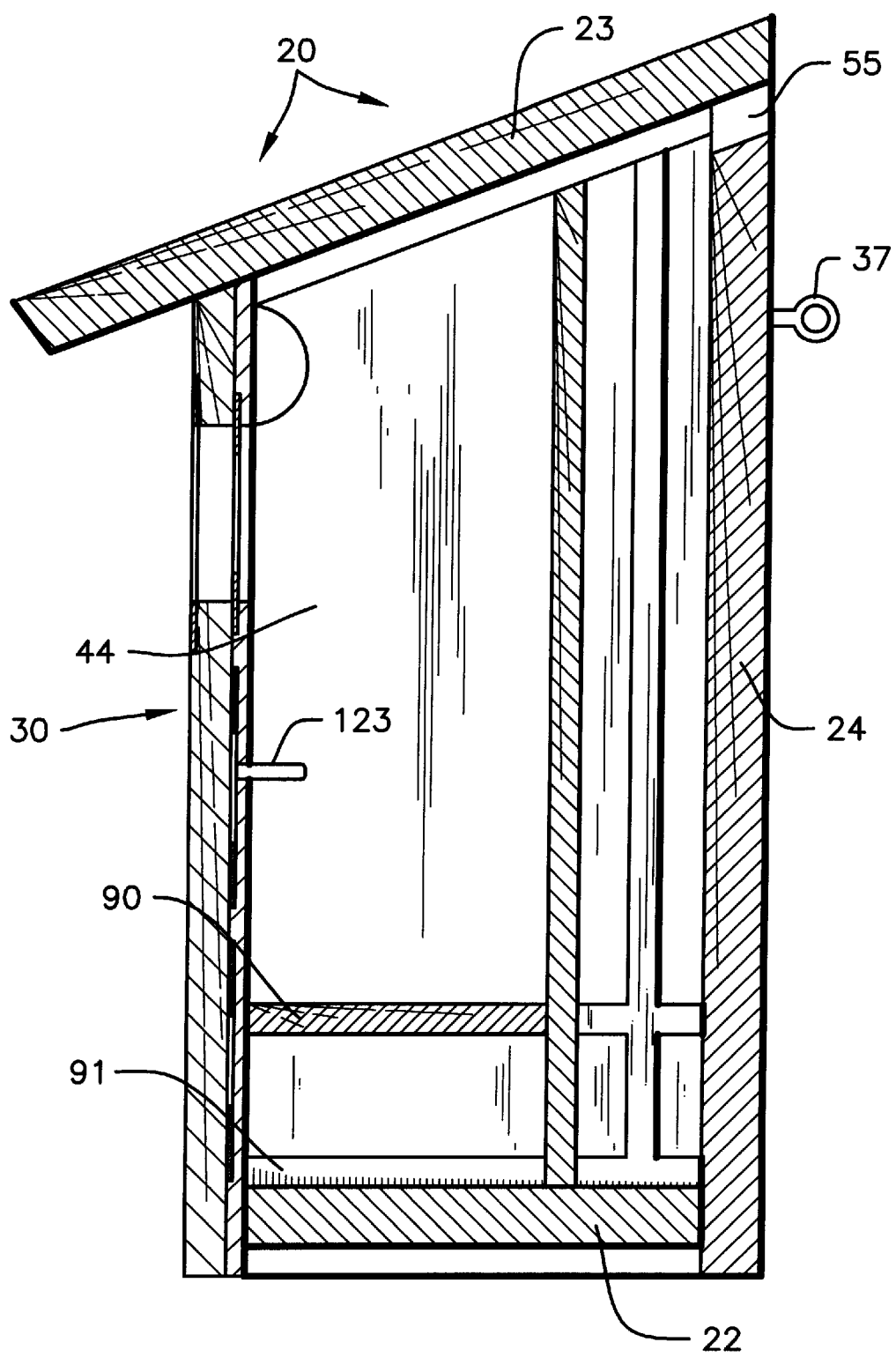
FIG. 5 is a longitudinal sectional view taken generally along line 5—5 in FIG. 1, with portions thereof broken away or omitted for clarity.

FIG. 13 shows the preferred hook construction used for assembly. As illustrated, a hook 25 is press-fitted to panel 28 and secured by pins 45. In assembly, the outer end of the applicable hook 25 or 29 is fitted within a slit 33 or 47 (FIG. 13), and pin 46 is captivated my relative movement of the panels within hook channel 49 to hold the panels together. This preferred construction facilities quick user assembly and disassembly.

The width of the interior nesting region 40 is defined between a planar, vertically extending, internal partition 44 and the inner, grooved surface 26A of right side panel 26. As will be further described hereinafter, partition 44 call be secured in alternative positions (i.e., to the left or right of the position shown in FIG. 3) to vary the effective width of region 40. In the best mode, the left side panel 24 does not have grooves machined into it, unlike right side panel 26.

The working height of the adjustable region 40 is defined between roof panel 23 (i.e., FIGS. 1, 5) and either base panel 22 (FIGS. 3, 7) or a selected floor shelf 48, 50. The largest height occurs when no separate floor shelf is installed. The floor shelves 48, 50 extend generally horizontally between internal side partition 44 and right side panel 26, at a user-selected distance above base panel 22. In operation the top floor shelf forms the floor of the nesting area. These floor shelves 48, 50 are slidably received within selected, horizontal grooves to be discussed hereinafter that are formed in the partition 44 and side panel surface 26A, between which the shelves extend. The upper surface area 48A (FIGS. 3, 4) of shelf 48 forms a floor upon which a bird nest is built. In the best mode the various floor shelves are made from ¼ inch plywood.

The breadth of region 40 is generally defined between the front door assembly 30 and the optional, user-selected rear wall 54 (FIG. 3). However, maximum breadth occurs when partition 54 is omitted, in which case maximum breadth is defined generally between the front door assembly 30 and the back panel 28. As described hereinafter, a selected rear wall 54 slidably extends between selected, generally vertical grooves defined in side partition 44 and the side panel surface 26A. As viewed in FIG. 3, it can be grasped by the user and lifted upwardly out of engagement with the grooves, for subsequent deployment in other aligned grooves. Thus it can be positioned towards or away from the viewer (i.e., as viewed in FIG. 3). Preferably the birdhouse 20 includes a selection of differently-sized pieces for forming rear wall 54 when the width of region 40 is enlarged or contracted. Preferably each rear wall piece is made of ¼ inch plywood.

Depending somewhat on the user-selected configuration, a number of is storage volumes are defined in the birdhouse. These storage volumes are useful for storing the differently sized, replacement floor shelves and rear walls that are substitutes for illustrated floor shelves 48, 50 and rear wall 54 when dimensions are varied. A first storage volume 60 is disposed between the base panel 22 and the underside of the applicable floor shelf 48. A second storage volume 64 is defined generally between left side panel 24 and side partition 44. Differently-configures substitutes for rear wall 54 are easily stored in volume 64. Finally, another useful storage volume 66 is defined at the rear of the birdhouse 20, between a selected rear wall (i.e., partition 54) and back panel 28. These volumes provide convenient storage for alternative rear walls (i.e., that replace wall 54) and alternative shelves 51 (FIG. 3) that can replace shelves 48 and/or 50.

Figure 7:
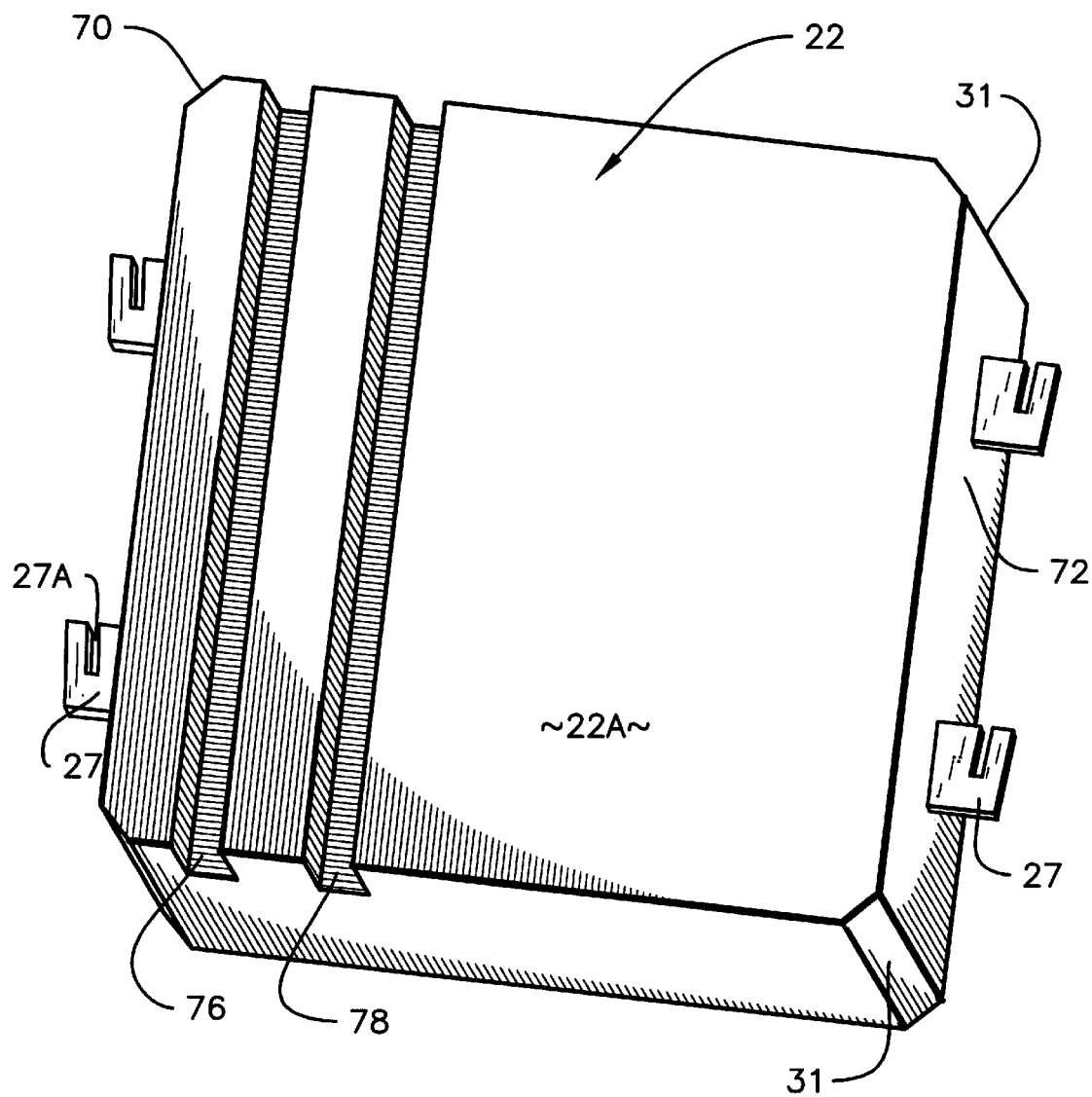
FIG. 7 is an enlarged perspective view of the preferred base panel.
Figure 8:
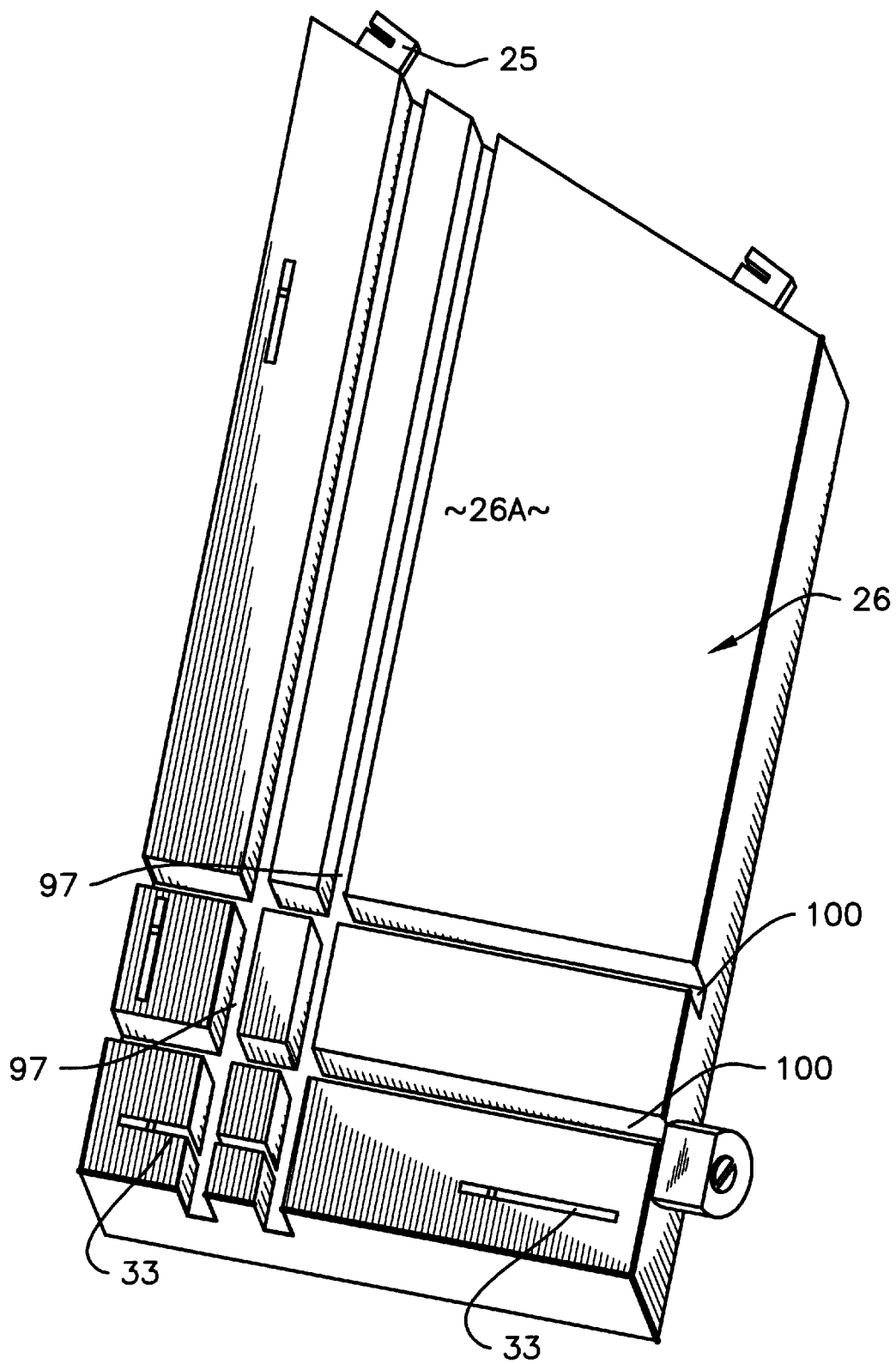
FIG. 8 is an enlarged, side elevational view of the right side panel.

With primary reference now directed to FIGS. 6 and 7, base panel 22 is generally rectangular. It's corners 31 (FIG. 7) are preferably chamfered. When the floor shelves 48 or 50 (FIG. 3) are missing, base panel surface 22A forms the nesting platform. The left and right edges 70, 72 have outwardly projecting hooks 27 that facilitate assembly. Each hook 27 has an internal slot 27A that captivates a suitable pill such as pin 46 (FIG. 13) that projects through a receptive slit 47 formed in the side panels 24, 26. By first inserting the hooks within the slits in each side panel, and then pushing the base panel gently, assembly is accomplished as the panels lock together.

Elongated grooves 76, 78 (FIGS. 6, 7) machined into surface 22A of base panel 22 are spaced apart and parallel with panel edges 70 and 72 (FIG. 7). Their purpose is to slidably captivate an edge of the internal partition 44 (FIG. 3). In assembly, partition 44 also engages the spaced-apart, elongated, vertical grooves 80 and 82 machined into the back panel 28 (FIGS. 3, 6). Base panel grooves 76, 78 (FIG. 6) respectively register with back plate grooves 80, 82 to properly, vertically align and position partition 44 in spaced-apart, parallel relation with side panels 24, 26.

Figure 9:
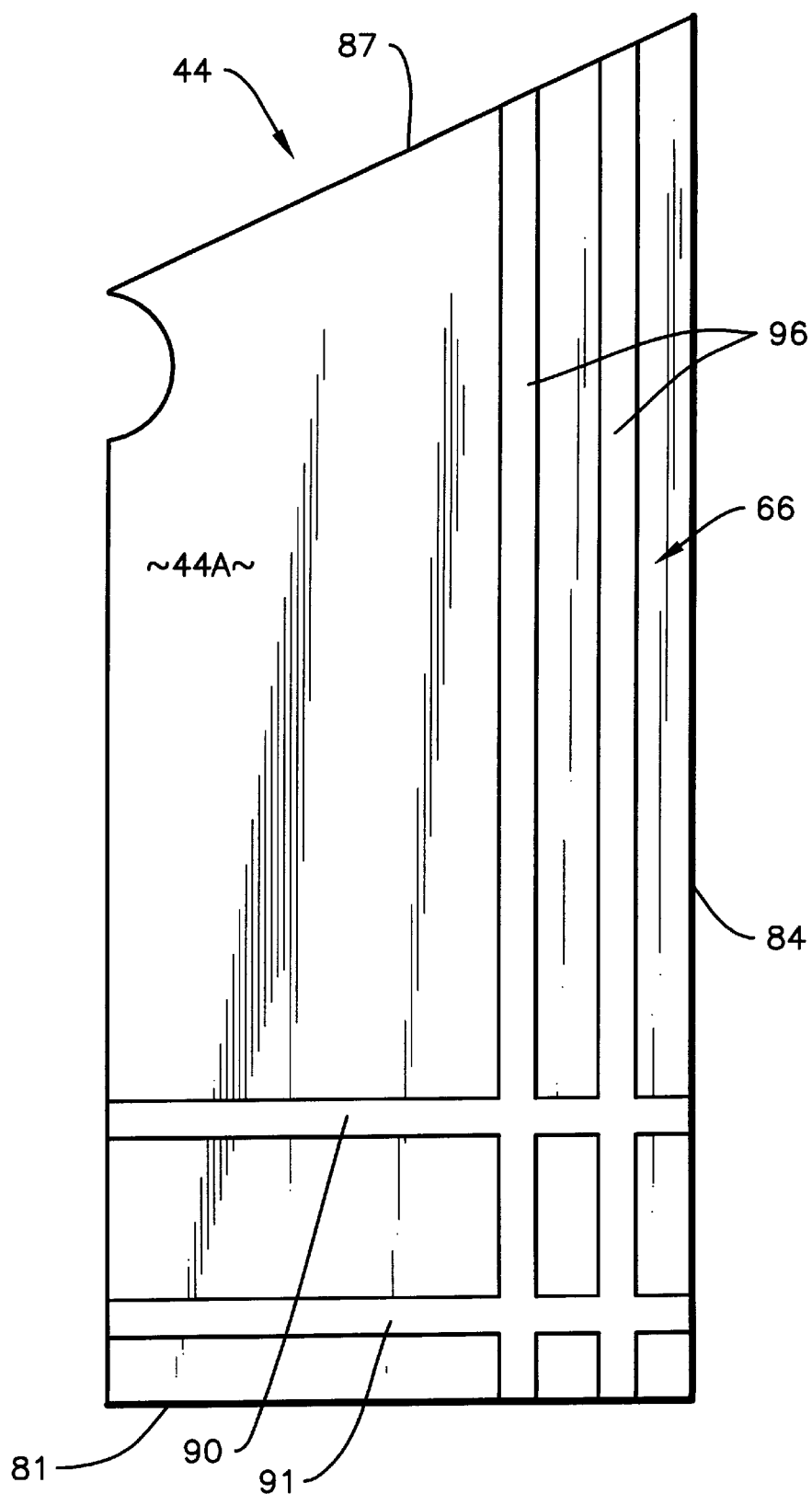
FIG. 9 is an enlarged, side elevational view of the internal partition.

Partition 44 is preferably cut from ⁵⁄₁₆–⅜ inch wood, with ⅜ inch plywood preferred. In assembly, the bottom edge 81 (FIG. 9) of partition 44 slidably seats within grooves 76 or 78. The right side edge 84 (i.e., as viewed in FIG. 9) slidably seats within selected real grooves 80 or 82 (FIGS. 3, 6). Grooves 76 and 78 are respectively coplanar with grooves 80 and 82. A pair of evenly spaced-apart and parallel grooves 90, 91 are machined into the partition surface 44A (FIG. 9). Similar parallel and vertically spaced-apart grooves 100 are defined in the inside face of right side panel 26. The selected floor shelves 48 or 50 slidably fit within parallel grooves 90, 91, 92 (FIG. 9) and a selected groove 100 (FIG. 6). Grooves 100 are generally coplanar with grooves 90, 92. The parallel vertical grooves 96 (FIG. 9) extend between angled, top edge 87 and bottom edge 81 (FIG. 9). Grooves 96 (FIG. 9) register with the coplanar, parallel and spaced-apart grooves 97 (FIG. 8) formed in the right side panel 26. The selected rear wall (i.e., partition 54) extends between grooves 96 and 97 and is slidably captivated therebetween. The top edge 87 of the partition 44 is inclined similarly with the top edges of side panels 24 and 26. Edge 87 is gently abutted by the underside of tile roof panel 23 once the birdhouse is assembled.

With emphasis now directed to FIGS. 1 and 10–12, the front door assembly 30 comprises a bird admission orifice assembly 36 previously discussed. Door assembly 30 further comprises a generally rectangular, front door panel 120 that receives a smaller, rectangular magazine assembly 122 that is fastened to panel 120 with a removable, L-shaped eye hook 123 (FIG. 5) that forms an internal perch. A dove-tail arrangement is used, so that magazine assembly 122 slides within recess 124. The bird-admission orifice assembly 36 comprises a relatively large diameter hole 126 in panel 120 that is concentrically bounded by an annular, preferably metal, squirrel-guard ring 128, and all aligned hole in the magazine assembly whose diameter is varied by the user.

The preferred magazine assembly 122 comprises a rectangular magazine panel 130 that has a hole 132 concentrically bounded by a circular recess 134 (FIG. 12). A selected annular, ring-shaped restrictor 139 is easily snap-fitted within recess 134 in assembly (FIGS. 10–12). The restrictor internal orifice 141, which has a diameter intended for a select bird species (Table 1), concentrically aligns with magazine panel orifice 132. When the magazine panel 130 is slidably coupled to door panel 120, orifices 141, 132 (FIG. 12) are concentric with larger orifice 126 and squirrel guard ring 128. The numerous alternative restrictors 146 preferably can be press fitted within similar, recessed circular recesses 148 (FIG. 10) formed in magazine panel 130 for storage. When a different bird species is selected, restrictor 139 can be popped out of recess 134 (FIG. 12), and then stored with other restrictors within a recess 148; the alternative restrictor 146 previously removed from a storage recess 148 (FIG. 10) is then snap-fitted over orifice 132. Thus, as the diameter of restrictor orifice 141 is different with each restrictor, a selected bird species is targeted by selecting all appropriate restrictor. This feature further enables the enclosure to be targeted for many different bird species. The desired restrictor orifice diameter is varied in accordance with Table 1 below, as the variable bird nesting volume is selected in assembly, thus creating a multi-species nesting system.

OPERATION AND ASSEMBLY

A selected bird species necessitates the internal nesting volume, admission orifice diameter, and other parameters as listed in the following table:

TABLE 1

Preferred Nesting Box Dimensions

| SPECIES | Floor (shelf) Dimensions (inches) | Hole Height above shelf (inches) | Hole Entrance Diameter (inches) | Placement Height (feet) |
|---|---|---|---|---|
| House Wrens, Carolina Wrens | 4 × 4 | 5 | 1.500 | 5–10 |
| Chickadees | 4 × 4 | 7 | 1.125 | 4–15 |
| Red Breasted Nuthatch and Downey Woodpecker | 4 × 4 | 7 | 1.250 | 5–15 |
| White Breasted Nuthatch | 4 × 4 | 7 | 1.375 | 5–15 |
| Titmice | 4 × 4 | 8 | 1.250 | 5–15 |
| Prothonotary Warbler | 5 × 5 | 5 | 1.125 | 4–8 |
| Violet Green Swallow | 5 × 5 | 5 | 1.500 | 10–15 |
| Bluebirds | 5 × 5 | 8 | 1.500 | 4–6 |
| Ash Throated Flycatcher | 6 × 6 | 8 | 1.500 | 5–15 |
| Great Crested Flycatcher | 6 × 6 | 8 | 1.750 | 5–15 |

To begin assembly, the back panel 28 may be firmly oriented upright on a stable surface with hooks 29 pointing upwardly. Side panel 24 is held firmly at a ninety degree angle relative to back panel 28, and two hooks on the left of back panel 28 are inserted into two slits in left side panel 24 as generally illustrated in FIG. 13. By pressing down on side panel 24, it becomes locked to back panel 28. Next, the bottom base panel 22 is held with its hooks 27 (FIG. 7) loosely inserted into the slits at the bottom of side panel 24. Right side panel 26 is next fastened to back panel 28. With a downward motion on right side panel 26 the panels are locked together.

Next, the box is firmly placed with its back panel 28 flatly abutting a solid supporting surface. Side panels 24 and 26 are deflected inwardly. Base panel 22 is locked in place by pressing downwardly. Then, with the box standing upwardly, the selected inner partition (i.e., partition 44) is placed within the appropriate slots to obtain a desired nesting volume size according to Table 1. The selected floor shelf 48, 50 and the selected back partition 51 or 54 (FIG. 3) are then slidably installed.

Next the desired bird hole size is selected. The magazine panel 130 must be removed from the door panel 120 by removing eye hook 123, and a desired restrictor 139 or 146 is placed within recess 134 (FIG. 12) as previously described, Unused restrictors 146 are snap-fitted within for storage within recesses 148. The appropriately modified magazine is then reinserted within the door panel., and hook 123 is loosely screwed in. The doorknob 32 is then screwed into a pre-drilled hole in the front edge of right side panel 26 so that it will be snug enough to turn and firmly lock the front door panel in a closed position.

Finally, with tile birdhouse 20 oriented upright on a solid surface, the roof panel 23 is latched to the hooks 25 (FIG. 6) projecting from the top of the left and right side panels 24 and 26 respectively. If the floor shelves (i.e., 48, 50) have not been installed already, the front door is opened and the shelves are slidably inserted between appropriate grooves as aforesaid. The optional eye hooks 37 (FIG. 2) can then be inserted in tile back panel 28. A suitable wire attached about these eye hooks 37 enables mounting of the birdhouse 20 on a tree, post, fence or the like.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A variable volume birdhouse comprising:
   a lower, generally planar base panel;
   a pair of spaced apart side panels rising vertically upwardly;
   a roof panel disposed atop said side panels;
   a back panel extending between said side panels;
   a front door assembly coupled to the birdhouse, the door assembly comprising an orifice providing ingress and egress to birds;
   means for varying the diameter of said orifice;
   a nesting region defined within said birdhouse; and,
   means for varying the volume of said nesting region, wherein the means for varying the volume of said nesting region comprises a partition disposed within said birdhouse, the partition spaced apart from a birdhouse side panel at a user selected distance for varying the nesting region width.

2. The birdhouse as defined in claim 1 wherein said means for varying the volume of said nesting region comprises a user selected shelf with predetermined dimensions disposed within said birdhouse in spaced apart, generally parallel relation to said base panel, said shelf providing a nesting surface at the bottom of the nesting region, and said shelf extending between said partition and a side panel at a user-selected height above the base panel whereby the nesting region height may be varied.

3. The birdhouse as defined in claim 1 wherein said means for varying the volume of said nesting region comprises a wall disposed within said birdhouse extending between said partition and a side panel at a user selected distance from said front door assembly whereby the nesting region breadth may be varied.

4. The birdhouse as defined in claim 3 wherein said means for varying the volume of said nesting region comprises a user selected shelf with predetermined dimensions disposed within said birdhouse in spaced apart, generally parallel relation to said base panel, said shelf providing a nesting surface at the bottom of the nesting region, and said shelf extending between said partition and a side panel at a user-selected height above the base panel whereby the nesting region height may be varied.

5. The birdhouse as defined in claim 4 wherein:
   said base panel comprises a plurality of grooves parallel with said side panels;

said back panel comprises a plurality of grooves parallel with said side panels and coplanar with said base panel grooves; and, said partition removably slides into aligned grooves on said base panel and said back panel.

6. The birdhouse as defined in claim 5 wherein:

said partition comprises vertical grooves and horizontal grooves;

a side panel comprises vertical grooves aligned with said partition vertical grooves and horizontal grooves aligned with said partition horizontal grooves;

the user-selected shelf slides between said partition and said side panel within horizontal grooves; and, the user-selected back panel slides between said partition and said side panel within vertical grooves.

7. The birdhouse as defined in claim 5 further comprising a plurality of storage volumes within said birdhouse separate from said nesting region.

8. The birdhouse as defined in claim 1 wherein:

the front door assembly comprises:

a generally rectangular, front door panel hinged to the birdhouse;

a magazine slidably fitted to said front door panel for storage therewith; and, said means for varying the diameter of said orifice comprises a plurality of restrictor rings stored on said magazine, each restrictor ring comprising a different internal diameter hole.

9. The birdhouse as defined in claim 1 wherein said means for varying the volume of said nesting region comprises a user-selected shelf with predetermined dimensions disposed within said birdhouse at a user-selected height above the base panel whereby the nesting region height may be varied.

10. The birdhouse as defined in claim 1 wherein said means for varying the volume of said nesting region comprises a wall adjustably disposed within said birdhouse at a user selected distance from said front door assembly whereby the nesting region breadth may be varied.

11. A variable volume birdhouse comprising:

a lower, generally planar base panel;

a pair of spaced-apart, vertically upright side panels;

a roof panel disposed atop said side panels;

a back panel extending between said side panels;

a front door assembly coupled to the birdhouse, the door assembly comprising an orifice providing ingress and egress to birds;

a nesting region defined within said birdhouse;

a partition disposed within said birdhouse, the partition spaced apart from a birdhouse side panel at a user selected distance for varying the nesting region width;

a shelf with user-selected dimensions disposed within said birdhouse at a user-selected height above the base panel adjacent said partition for establishing a user-selected nesting region height; and, whereby the volume of the nesting region within the birdhouse is varied to suit a given bird species.

12. The birdhouse as defined in claim 11 wherein said shelf provides a nesting surface at the bottom of the nesting region, and said shelf extends between said partition and a side panel at a user-selected height above the base panel.

13. The birdhouse as defined in claim 11 further comprising an adjustable wall disposed within said birdhouse at a user selected distance from said front door assembly whereby the nesting region breadth may be varied.

14. The birdhouse as defined in claim 13 wherein:

said base panel comprises a plurality of grooves parallel with said side panels;

said back panel comprises a plurality of grooves parallel with said side panels and coplanar with said base panel grooves; and, said partition removably slides into aligned grooves on said base panel and said back panel.

15. The birdhouse as defined in claim 14 wherein:

said partition comprises vertical grooves and horizontal grooves;

a side panel comprises vertical grooves aligned with said partition vertical grooves and horizontal grooves aligned with said partition horizontal grooves;

the user-selected shelf slides between said partition and said side panel within horizontal grooves; and, the user-selected back panel slides between said partition and said side panel within vertical grooves.

16. A birdhouse configurable by a user for different bird species, said birdhouse comprising:

a lower, generally planar base panel;

a pair of spaced apart side panels rising vertically upwardly from said base;

a roof panel disposed atop said side panels;

a back panel extending between said side panels;

a front door assembly coupled to the birdhouse and comprising:

a generally rectangular, front door panel hinged to the birdhouse;

a magazine slidably fitted to said front door panel for storage therewithin;

an orifice providing ingress and egress to birds;

means for varying the diameter of said orifice comprising a plurality of annular, restrictor rings, each restrictor ring comprising a different internal diameter hole, a selected restrictor ring adapted to be coupled to said orifice by the user to adapt the birdhouse for different bird species; and, wherein the magazine comprises a plurality of circular recesses adapted to store the restrictor rings; and, a nesting region defined within said birdhouse accessible through said orifice.

17. The birdhouse as defined in claim 16 further comprising:

a partition disposed within said birdhouse, the partition spaced apart from a birdhouse side panel at a user selected distance for varying the nesting region width; and, a user-selected shelf with predetermined dimension disposed within said birdhouse at a user-selected height above the base panel whereby the nesting region height may be varied.

18. The birdhouse as defined in claim 17 further comprising a wall adjustably disposed within said birdhouse at a user selected distance from said front door assembly whereby the nesting region breadth may be varied.

* * * * *